United States Patent

[11] 3,579,267

[72] Inventor Carl Macey Wright
Cinnaminson, N.J.
[21] Appl. No. 860,592
[22] Filed Sept. 24, 1969
[45] Patented May 18, 1971
[73] Assignee RCA Corporation

[54] DECIMAL TO BINARY CONVERSION
4 Claims, 2 Drawing Figs.

[52] U.S. Cl. .......... 235/155, 340/347DD
[51] Int. Cl. .......... H03k 13/24
[50] Field of Search .......... 235/154, 155; 340/347

[56] References Cited
UNITED STATES PATENTS
2,894,686 7/1959 Holmes .......... 235/155
3,026,035 3/1962 Coleur .......... 235/155
3,185,825 5/1965 McDonald et al. .......... 235/155
3,524,976 8/1970 Wang .......... 255/155

*Primary Examiner*—Maynard R. Wilbur
*Assistant Examiner*—Gary R. Edwards
*Attorney*—H. Christoffersen

ABSTRACT: Successive 4-bit numbers representing successive decimal digits in decreasing order of significance are inserted into one portion of a register means. During each period between the insertion of one 4-bit number and the next, the bits are shifted stage-to-stage and an adder serially adds the bit stored in one stage of said one portion of the register means to bits stored in two other stages of the register means. The selection of stages is such as to cause to be added to each new decimal digit, the two multiple and the eight multiple of a binary number representing all previously applied decimal digits. The successive sum bits produced by the adder are returned, in serial fashion, to the register means and represent a new binary number equal to the digits inserted, to that point, of the decimal number.

INVENTOR.
CARL M. WRIGHT
BY
Samuel Cohen
Attorney

Patented May 18, 1971

3,579,267

2 Sheets-Sheet 2

INVENTOR.
CARL M. WRIGHT
BY
Samuel Cohen
Attorney

DECIMAL TO BINARY CONVERSION

BACKGROUND OF THE INVENTION

Most computer operators prefer to employ decimal numbers as inputs to a computer. However, in small computers such as desk top calculators and in some large computer systems such as those employed for time sharing, in the interest of more efficient computer operation, the decimal numbers should be translated to binary numbers before other operations begin. Binary arithmetic operations, as one example, are simpler to implement than decimal arithmetic operations because the available register capacity is used more efficiently and because the corrections and carries required in binary coded decimal (BCD) arithmetic, when a digit is between the values of 10 and 15 inclusive, are eliminated.

Decimal numbers may be entered into a computer via a keyboard and it is most convenient to depress the keys in the normal sequence, that is, the key for the most significant digit first. The problem arising from such a presentation is that the number of digits to be entered is not known in advance by the machine. While departures from the conventional entry of numbers via keyboards can ease these problems, they would result in more work for the operator and the abnormal nature of the presentation easily could lead to human errors.

The object of the present invention is to provide an improved decimal to binary number conversion circuit that is very simple and therefore relatively inexpensive and which operates in the normal manner, that is, which accepts the decimal numbers, most significant digit first, and which produces a binary number that is always correct, that is, which is of the correct value up to the decimal digit last entered.

SUMMARY OF THE INVENTION

Successive 4-bit numbers representing successive decimal digits, in decreasing order of significance, are inserted into one portion of a register means. During each period between the insertion of one such number and the next, the inserted number is shifted stage to stage and during each shift interval an adder adds a group of three bits, taken from three stages of the register means. The stages are selected to obtain the serial addition of the 2 multiple of the stored number to the 8 multiple of the stored number to the number just inserted, whereby the adder produces successive sum bits representing the binary equivalent of the digits of the decimal number inserted up to that point.

DETAILED DESCRIPTION

Figure 1:
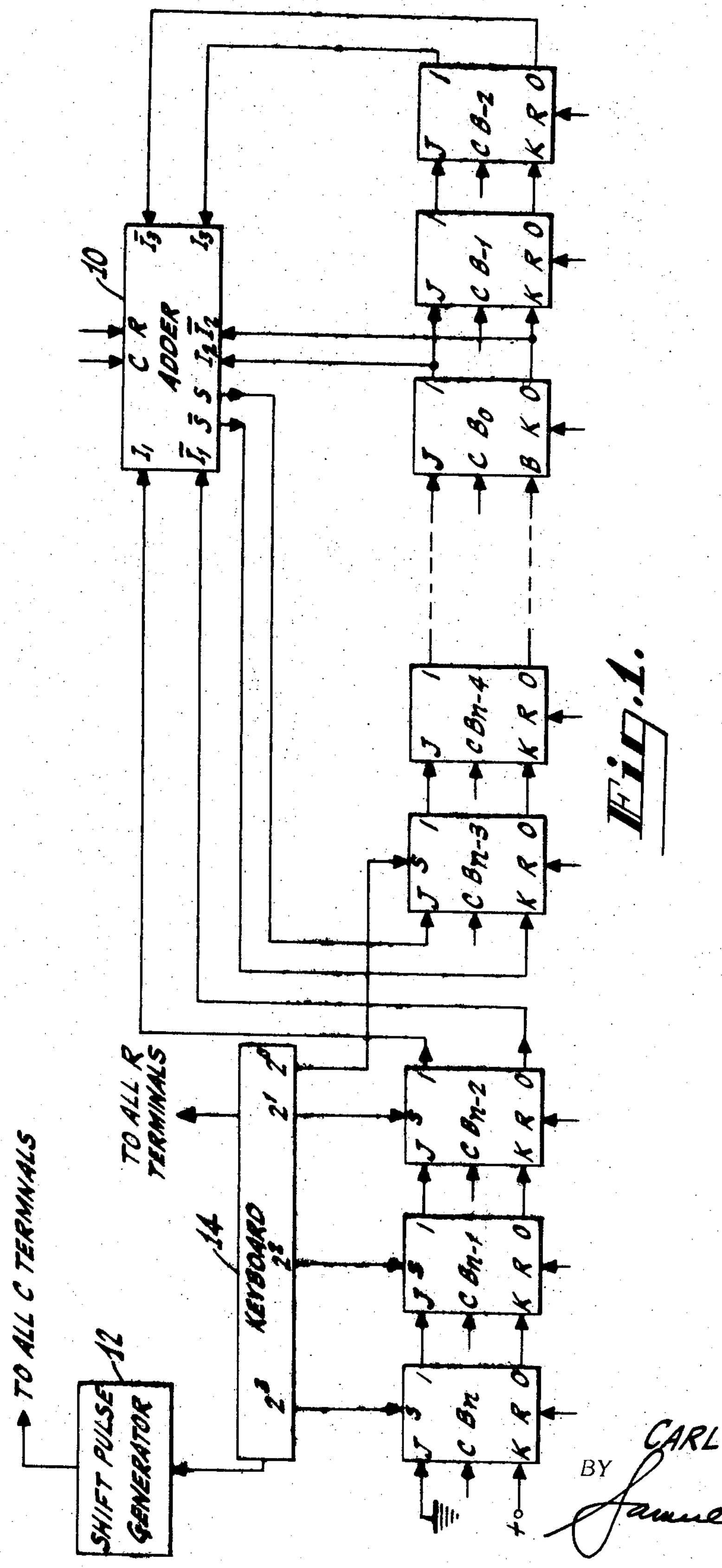
FIG. 1 is a block diagram of a preferred embodiment of the present invention.

The system of the present invention operates on the principle that a decimal number may be converted to a binary number by obtaining successive 10 multiples and performing successive addition steps. For example, the conversion of 387 decimal to 387 binary may be accomplished by multiplying the most significant digit 3 by 10 and adding it to 8 to obtain 38 binary. The 38 is then multiplied by 10 and added to 7 to obtain 387 binary. In the present system, the multiplication of a digit by 10 is carried out by multiplying it by 2 and multiplying it by 8, and adding the two products. The multiplication of a binary-coded decimal or binary number by 2 is accomplished by effectively shifting the number one place to the left and the multiplication by 8 is accomplished by effectively shifting the number three places to the left.

While the general algorithm above is in itself well-known, the present invention resides in a new and very simple system for implementing this algorithm without preliminary shifts or delays. The system requires only shift register means, shown in FIG. 1 to comprise a plurality of JK flip-flop stages $B_n$, $B_{n11}$ .... $B_0$, $B_{11}$, $B_{118\ 2}$, an adder such as 10, a shift pulse generator such as 12, and a data insertion means such as keyboard 14. The latter is in itself conventional. It may include keys representing the decimal digits 0 through 9, a clear or reset key, and other keys calling for addition, subtraction and so on. As the latter keys are not of interest in the present arrangement, they are not discussed further.

In the operation of the system of FIG. 1, when a numbered key on the keyboard 14 is depressed, a 4-bit binary (or binary-coded decimal number—they are equivalent when only 4 bits are considered) is inserted into the most significant four stages $B_n$ .... $B_{n13}$ of the register means. In this particular register, the insertion is accomplished by applying the bits to the S terminals. In addition, in this particular arrangement, the four bits are inserted in parallel. However, it is to be understood that the invention operates equally well with the bits clocked into the four stages serially, as is sometimes done in small desk top calculators.

Each time a key on the keyboard is released after being depressed, the shift pulse generator 12 is activated and it generates a group of sequential pulses $t_1$, $t_2$ .... $t_n$, where $n$, the number of such pulses, is sufficient to cause the least significant, that is the $2^0$-bit of the 4-bit number to be shifted from $B_{n13}$ stage to the $B_0$ stage. The shift pulses, as is clear from the drawing, are applied to all of the shift (C) terminals of the register and are applied also to the adder. Each time a shift pulse occurs, the bits in all except $B_{n12}$ and $B_{12}$ stages of the register are shifted one stage forward, that is, are shifted to the stage of next lower significance. The bit stored in the $B_{n\ 12}$ stage is applied to the adder as is the bit in the $B_{12}$ stage. The bit stored in the $B_0$ stage, in addition to being shifted one stage forward, also is applied to the adder.

In response to each shift pulse, the output of the adder 10 is shifted into register stage $B_{n13}$. The adder 10 is always the sum of the three inputs $(I_1+I_2I_3)$ and the carry generated during the previous shift pulse. As will be shown shortly, this carry is stored in the adder 10 for the interval from one shift pulse to the next.

The conversion may be best understood by a specific example. Assume that it is desired to convert decimal 387 to binary 387. First, the reset key is depressed. This causes a reset pulse to be applied to all reset terminals to clear all storage stages. Next, the key 3 is depressed. This causes binary 3=0011 to be inserted, in parallel, into stages $B_n$ .... $B_{n13}$. The insertion is completed by the time the key is depressed and when the key is released, the shift pulse generator 12 is activated and generates its sequential pulses. The least significant bit 1 of 0011 is shifted by these pulses from stage-to-stage until it reaches the $B_0$ stage. In a similar manner, the remaining 3 bits 001 are shifted by these pulses through the adder 10 until they reach stages $B_3$, $B_2$ and $B_1$, respectively. Accordingly, by the time the last shift pulse terminates, and this is well prior to the time the next key is depressed, the number just inserted into the $B_n$ .... $B_{n13}$ stages has been moved to the $B_3$ .... $B_0$ stages.

It is to be understood that the shifting above occurs very rapidly relative to the time between the depression of two successive keys. Even an extremely fast operator cannot depress successive keys on the keyboard in a time faster than a fraction of a second whereas the shift pulse generator 12 easily can generate its group of pulses in tens of microseconds with many circuits of standard design.

After the operation discussed above, the operator depresses and releases the key 8. This causes the binary number 1000 to be inserted into stages $B_n$ .... $B_{n13}$ and the group of sequential shift pulses $t_1$ .... $t_{n13}$ then to start. The addition depicted in the upper part (above the double line) of Table I now starts. The numbers which are added by the adder 10 during any shift pulse period appear in the first three rows beneath that particular shift pulse and in the same column.

TABLE I

| $t_8$ | $t_7$ | $t_6$ | $t_5$ | $t_4$ | $t_3$ | $t_2$ | $t_1$ | | Shift pulses |
|---|---|---|---|---|---|---|---|---|---|
| | | | | 0 | 0 | 1 | 1 | | Number stored in $B_3 B_2 B_1 B_0$=3. |
| | | | | | 1 | 0 | 0 | 0 | Number inserted in $B_n B_{n-1} B_{n-2} B_{n-3}$=8. |
| | | 0 | 0 | 1 | 1 | | | | Number shifted to $B_1 B_0 B_{-1} B_{-2}$=3. |
| | | | 1 | 0 | 0 | 1 | 1 | 0 | Successive sum bits produced=38 (binary). |
| | | 1 | 0 | 0 | 1 | 1 | 0 | | Number stored in $B_3 B_2 B_1 B_0$=38. |
| | | | | | 0 | 1 | 1 | 1 | Number inserted in $B_n \ldots B_{n-3}$ 7. |
| 1 | 0 | 0 | 1 | 1 | 0 | | | | Number shifted to $B_3 B_2 \ldots B_{-2}$ =38. |
| 1 | 1 | 0 | 0 | 0 | 0 | 0 | 1 | 1 | Successive sum bits produced=387 (binary). |

As is clear from the table above, during the first shift pulse, $t_1$, the adder adds the least significant bit of the number 3 (this bit is stored in the $B_0$ stage) to the second least significant bit of the number 8 (this bit is stored in the $B_{n12}$ stage). The 4-bit binary equivalent of the decimal number 8 therefore appears shifted one place to the right relative to the stored number 3. That is, the stored number 3 is shifted one place to the left relative to the new number 8 so that 6 (the 2 multiple of 3) is being added to 8.

During the second shift pulse, $t_2$, the second least significant digit of 3 is added to the third least significant digit of a number 8. By the time the third shift pulse, $t_3$, arrives, the least significant bit of the number 3 is present in the $B_{12}$ stage. At this same time, the most significant bit of the number 8 is present in the $B_{n12}$ stage. Concurrently, the third least significant bit of the number 3 is in the $B_0$ stage. It should be clear from the upper part of Table I that what is actually occurring at this time is that the number 3 relatively shifted three places to the left is being added to the number 8 and is being added to the number 3 relatively shifted one place to the left. In other words, 24 (the 8 multiple of 3) is being added to 6 (the 2 multiple of 3) and to the number 8.

The process above continues until all of the shift pulses have been exhausted. At this time, the sum produced as a result of the steps described has been shifted into and is stored in the six stages $B_5$ $B_4$ .... $B_0$, all as shown in Table I. As is also clear from the table, this sum is 38 binary so that the first two decimal numbers have been converted to their binary equivalent.

The lower part of Table I (below the double line) shows the completion of the conversion of 387 decimal to 387 binary. As should be clear from the foregoing explanation, what is done is to add the 2 multiple of 38 to the 8 multiple of 38 to the next decimal number 7 to obtain 387 binary.

The pulse generator 12 is designed to produce a number of pulses depending upon the number of stages in the shift register means. The number of stages, in turn, depends upon the number of decimal digits it is desired to convert to binary digits. In the example shown–the conversion of 387 decimal to 387 binary, the binary number 387 is stored in nine stages, $B_8$, $B_7$ .... $B_0$. In addition, there is required the 2 least significant stages $B_{11}$ and $B_{12}$. In addition, the other stages $B_n$, $B_{n11}$ and $B_{n12}$ are needed. In general, to store a number not greater than $10^X$, the number of stages required is given by (10X)/3+8, or the next larger integer, if (100X)/3+8 is not an integer. The binary equivalent of the decimal number will be stored in register positions $B_{n16}$ through $B_0$. The value of $n$ is given by (10X)/3+$b$06.

When the value of $n$ has been determined, the shift pulse generator 12 is designed to generate a train of pulses, $n$–3 in number, when triggered by the activation of a number button on the keyboard 14. Such generators are well known in the art and need not be described in detail.

Figure 2:
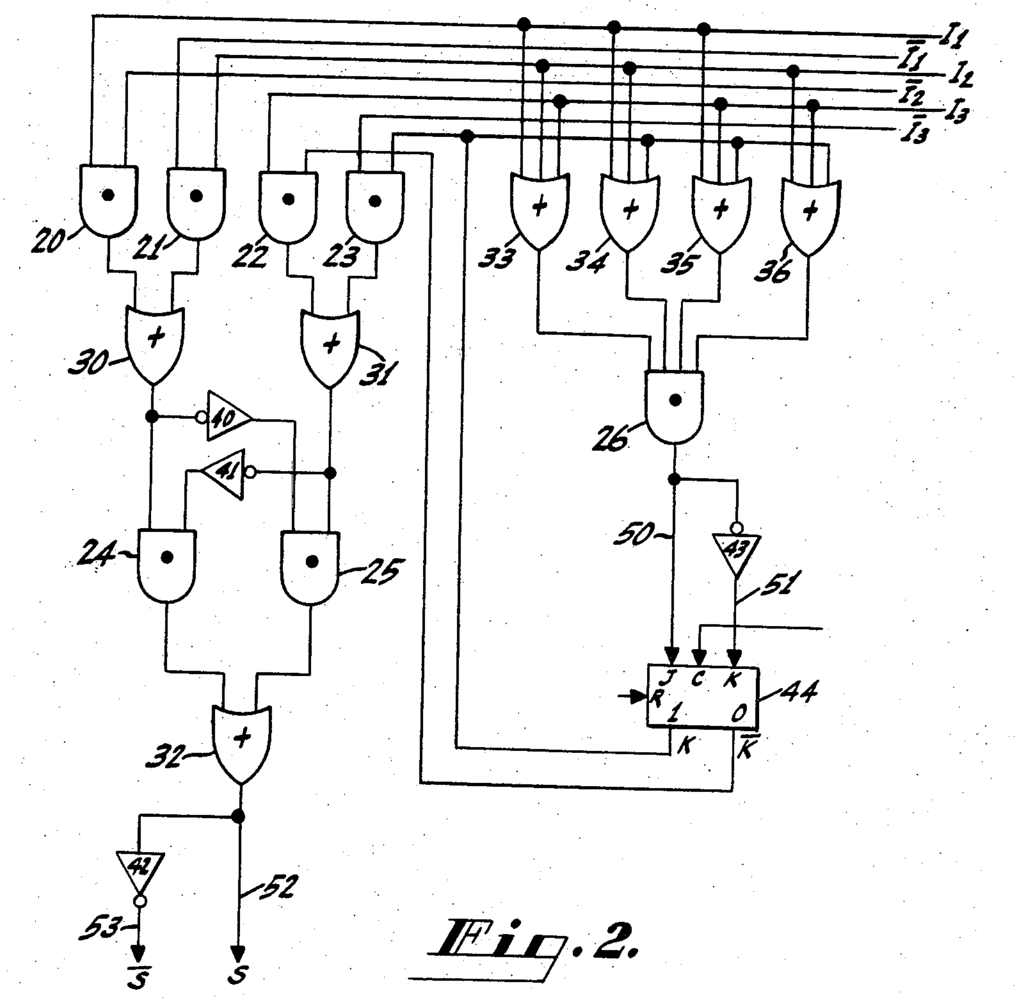
FIG. 2 is a logic diagram of one form of adder which may be used in the circuit of FIG. 1.

While any one of a number of different types of adders may be employed, the one shown in FIG. 2 is specially designed for the purpose. It includes seven AND gates, 20 to 26, seven OR gates, 30 to 36, four inverters, 40 to 43 and one JK flip-flop 44.

The arrangement is such that it implements the Boolean equations for addition. It is a relatively simple three operand adder that takes advantage of the property that not more than three of the four bits $I_1$, $I_2$, $I_3$, K ever have the value 1 at the same time. A specific example is given below to show how the circuit operates.

Assume first that $I_1=I_2=1$ and that $I_3$ and K, the previous carry=0. AND gate 20 receives inputs $I_1$ and $\bar{I}_2$ and is disabled since $\bar{I}_2=0$. AND gate 21 receives inputs $\bar{I}_1$ and $I_2$ and is disabled since $\bar{I}_1=0$. AND gate 22 receives inputs $I_3$ and $\bar{K}$ and is disabled as $I_3=0$. AND gate 23 receives inputs $\bar{I}_3$ and K and is disabled as K=0. Accordingly, both AND gates 24 and 25 are disabled and S=0 and $\bar{S}$=1.

The carry circuit implements the Boolean equation: $K=(I_1+I_2+I_3)(I_1+I_2+K)(I_1+I_3+K)(I_2+I_3+K)$ As $I_1=1$ is present in the first three expressions within the parenthesis, the first three OR gates 33, 34, 35 are enabled and as $I_2$ is present in the last expression within the parenthesis, OR gate 36 is enabled. Accordingly, AND gate 26 becomes enabled and flip-flop 44 becomes set and stores a 1 at the next clock pulse. Thus the circuit has been shown to produce an output S=0 and C=1 when two of the four input bits have the value 1. It readily can be shown that the circuit also operates properly for the remaining cases.

In the operation of the adder of FIG. 2, the flip-flop 44 stores the carry generated during the previous shift pulse $t_i$. In response to the next shift pulse $t_i$+1, the sum, which is already present at terminals S and $\bar{S}$, is shifted into the $B_{n-3}$ stage (FIG. 1) and the carry, which already is calculated based on the previous values of $I_1$, $I_2$, $I_3$ and the previous carry K, and which is present on lead 50 (and its complement on its lead 51) is inserted into the flip-flop 44. This carry now remains stored in this flip-flop until the next shift pulse $t_{i+2}$. After the carry is stored and before the next shift pulse $t_{i+2}$ occurs, the values of $I_1$, $I_2$ and $I_3$ may change. This does not affect the stored carry as information cannot be shifted into flip-flop 44 until the next shift pulse $t_{i+1}$ occurs. Similarly, immediately after one shift pulse $t_{i+1}$ and before the next shift pulse $t_{i+1}$, the new sum and its complement are present on leads 52 and 53 respectively but do not affect stage $B_{n13}$. These bits are not shifted into the flip-flop $B_{n13}$ until the next shift pulse $t_{i+1}$ occurs.

As already stated, the broad idea of shifting and adding to obtain the 10 multiple is in itself known. For example, it is employed in a form different than that employed here, in the conversion scheme illustrated in McDonald, et al. Pat. No., 3,185,825. In the patented system, two left shifts are employed to obtain the 4 multiple and it is added to the one multiple to obtain the 5 multiple. The 5 multiple is then shifted one place to the left to obtain the 10 multiple.

An important advantage of the present system over that of the patent is its simplicity. In the present arrangement, only register means, an adder, a shift pulse generator, and data input means are employed, whereas in the McDonald, et al. system, in addition to these components, numerous logic gates and delay means are required. This difference is of great importance in a field such as desk top calculators, where, in order to be competitive, the hardware must be inexpensive and must occupy little space. In the present system, because of the ingenious way in which the elements are interconnected, their number may be reduced to a minimum satisfying both requirements above. In addition, the circuit is simple and yet it exhibits high operating speed—all shifting is simulated during a single serial add cycle. In McDonald, during a first serial add cycle the 5 multiple is obtained, and a second serial add cycle is needed to obtain the 10 multiple and perform the next addition.

I claim:

1. A system for converting a decimal number to a binary number comprising, in combination:

a plurality of shift register stages;

means for inserting into four of said stages, during successive time intervals, successive 4-bit numbers representing the successive decimal digits of said decimal number;

means for shifting the bits stored in the least significant of said four stages and in the remaining ones of said stages, from stage to stage during each such time interval;

adder means;

means for shifting during each shift of said bits from one stage to the next, a bit from one stage to said adder means, a bit from another stage to said adder means, and a bit from the second least significant of said four stages to said adder means for causing to be added serially the 2 multiple of the previous sum produced by said adder means to the 8 multiple of said previous sum to the 4-digit number just inserted into said register; and means for inserting, during each shift of said bits from one stage to the next, the sum bit produced by the adder back into a given stage in said register.

2. A circuit for converting a binary coded decimal (BCD) number representing a multiple digit decimal number of a binary number comprising, in combination:

register means having a plurality of storage stages $B_n$, $B_{n11}$, $B_{n12}$, $B_{n13}$, $B_{n14}$......$B_1$, $B_0$, $B_11$, $B_12$, in decreasing order of significance, each stage having a shift terminal, signal input terminal means and signal output terminal means, each stage except the $B_{n12}$ and $B_{12}$ stages being connected at its output terminal means to the input terminal means of the stage of next lower significance for shifting the bit stored therein to said stage of next lower significance in response to a shift pulse applied to its shift terminal;

means for inserting into the most significant four stages $B_n$....$B_{n1b3}$ of said register, during successive time intervals, the successive 4-bit BCD numbers which define said multiple digit decimal number, starting with the most significant decimal digit;

adder means connected to the output terminal means of the $B_{n12}$, $B_0$ and $B_{12}$ stages of said register means for adding, in response to each shift pulse, the bits stored in these stages to any carry produced in response to the preceding shift pulse, for producing a sum signal and applying it to the input terminal means of said $B_{n13}$ stage, and for producing and storing a carry; and means responsive to each insertion into said register means of four bits of a BCD number, for applying a group of time sequential shift pulses to the shift terminals of all stages of said register means and to said adder means, of sufficient number to shift the least significant bit of said BCD number from said $B_{n13}$ stage to said $B_0$ stage of said register means and for causing said adder means to perform a number of sequential additions equal to the number of said shift pulses in said group.

3. A circuit as set forth in claim 2, wherein said means for inserting comprises a keyboard.

4. In a system for converting a decimal number into an equivalent binary number by shifting the binary digits already converted to obtain even multiples thereof to be added together to derive the tens multiple of the binary number to be added to the decimal digit being entered, the improvement comprising:

adder means having input terminal means for signals representing three bits to be added and an output terminal means for producing a manifestation of a sum; and binary register means storing said binary number and the binary equivalent of said decimal digit coupled at three stages thereof to said three input means, respectively, of said adder means, and coupled at another stage to said output terminal means of said adder means, and coupled at another stage to said output terminal means of said adder means for receiving said manifestation of a sum, said binary register means including also additional stages preceeding and following the stages containing the binary number for rendering unnecessary any preliminary shifts to obtain said even multiples of said binary number.

UNITED STATES PATENT OFFICE
CERTIFICATE OF CORRECTION

Patent No. 3,579,267 Dated May 18, 1971

Inventor(s) Carl M. Wright

PAGE -1

It is certified that error appears in the above-identified patent and that said Letters Patent are hereby corrected as shown below:

Col. 1, line 75, "$B_n$, $B_{n11}$" should read --$B_n$, $B_{n-1}$. . .--

Col. 2, line 1, "$B_0$, $B_{11}$, $B_{1182}$," should read --$B_0$, $B_{-1}$, $B_{-2}$,--

Col. 2, line 13, "$B_n$. . . $B_{n13}$" should read --$B_n$ . . . $B_{n-3}$--

Col. 2, line 26, "$B_{n13}$" should read --$B_{n-3}$--

Col. 2, line 29, "$B_{n12}$ and $B_{12}$" should read --$B_{n-2}$ and $B_{-2}$--

Col. 2, line 31, "$B_{n12}$" should read --$B_{n-2}$--

Col. 2, line 32, "$B_{12}$" should read --$B_{-2}$--

Col. 2, line 37, "$B_{n13}$" should read --$B_{n-3}$--

Col. 2, line 48, "$B_n$ . . . $B_{n13}$" should read --$B_n$. . . $B_{n-3}$--

Col. 2, line 58, "$B_n$ . . . $B_{n13}$" should read --$B_n$. . . $B_{n-3}$--

Col. 2, line 70, "$B_n$ . . . $B_{n13}$" should read --$B_n$ . . . $B_{n-3}$--

Col. 2, line 71, "$t_1$ . . . $t_{n13}$" should read --$t_1$ . . . $t_{n-3}$--

UNITED STATES PATENT OFFICE

CERTIFICATE OF CORRECTION

Patent No. 3,579,267 Dated May 18, 1971

Inventor(s) Carl M. Wright

It is certified that error appears in the above-identified patent and that said Letters Patent are hereby corrected as shown below:

Col. 3, line 22, "$B_{n12}$" should read --$B_{n-2}$--

Col. 3, line 31, "$B_{12}$" should read --$B_{-2}$--

Col. 3, line 33, "$B_{n12}$" should read --$B_{n-2}$--

Col. 3, line 61, "$B_{11}$ and $B_{12}$" should read -- $B_{-1}$ and $B_{-2}$--

Col. 3, line 61, "$B_n$, $B_{n11}$" should read --$B_n$, $B_{n-1}$--

Col. 3, line 62, "$B_{n12}$" should read --$B_{n-2}$--

Col. 3, line 63, "(10X)/3+8" should read --10X/3+8--

Col. 3, line 64, "(100X)" should read --10X--

Col. 3, line 66, "$B_{n16}$" should read --$B_{n-6}$--

Col. 3, line 67, "(10X)/3+b06" should read --10X/3+6--

Col. 4, line 41, "$t_{i+1}$" should read --$t_{i+2}$--

Col. 4, line 42, "$t_{i+1}$" (second occurrence) should read --$t_{i+2}$--

Col. 4, line 44, "$B_{n13}$" should read --$B_{n-3}$--

UNITED STATES PATENT OFFICE
CERTIFICATE OF CORRECTION

Patent No. 3,579,267 Dated May 18, 1971

Inventor(s) Carl M. Wright

It is certified that error appears in the above-identified patent and that said Letters Patent are hereby corrected as shown below:

Col. 4, line 45, "$B_{n13}$" should read --$B_{n-3}$--

Col. 4, line 45, "$t_{i+1}$" should read --$t_{i-2}$--

Col. 5, line 23, "$B_n$, $B_{n11}$" should read --$B_n$, $B_{n-1}$--

Col. 5, line 24, "$B_{n12}$, $B_{n13}$, $B_{n14}$. . . $B_1$, $B_0$, $B_11$, $B_12$" should read --$B_{n-2}$, $B_{n-3}$, $B_{n-4}$. . . $B_1$, $B_0$, $B_{-1}$, $B_{-2}$--

Col. 5, line 27, "$B_{n12}$ and $B_{12}$" should read --$B_{n-2}$ and $B_{-2}$--

Col. 5, line 33, "$B_n$ . . . $B_{n1b3}$" should read --$B_n$. . . $B_{n-3}$--

Col. 5, line 38, "$B_{n12}$, $B_0$ and $B_{12}$" should read --$B_{n-2}$, $B_0$ and $B_{-2}$--

Col. 6, line 4, "$B_{n13}$" should read --$B_{n-3}$--

Col. 6, line 11, "$B_{n13}$" should read --$B_{n-3}$--

Col. 6, lines 31-33, delete "and coupled at another stage to said output terminal means of said adder means"

Signed and sealed this 14th day of March 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334